(12) United States Patent  
Sarkar et al.

(10) Patent No.: US 8,709,674 B2
(45) Date of Patent: *Apr. 29, 2014

(54) FUEL CELL SUPPORT STRUCTURE

(75) Inventors: Partho Sarkar, Alberta (CA); Mark Richardson, San Francisco, CA (US); Luis Yamarte, Alberta (CA)

(73) Assignee: Alberta Research Council Inc. (CA)

( * ) Notice: Subject to any disclaimer, the term of this patent is extended or adjusted under 35 U.S.C. 154(b) by 1833 days.

This patent is subject to a terminal disclaimer.

(21) Appl. No.: 11/303,042

(22) Filed: Dec. 15, 2005

(65) Prior Publication Data

US 2006/0246337 A1 Nov. 2, 2006

Related U.S. Application Data

(63) Continuation-in-part of application No. 10/504,624.

(51) Int. Cl.
*H01M 8/24* (2006.01)
*H01M 8/10* (2006.01)

(52) U.S. Cl.
USPC ........... 429/466; 429/465; 429/468; 429/467; 429/495; 429/491; 429/497

(58) Field of Classification Search
USPC ........... 429/34, 466, 468, 469, 465, 467, 495, 429/491, 497
See application file for complete search history.

(56) References Cited

U.S. PATENT DOCUMENTS

| | | |
|---|---|---|
| 3,707,234 A | 12/1972 | Salemi |
| 4,454,207 A | 6/1984 | Fraioli et al. |
| 4,490,444 A | 12/1984 | Isenberg |
| 4,567,117 A | 1/1986 | Patel et al. |
| 4,664,986 A | 5/1987 | Draper et al. |
| 4,728,584 A | 3/1988 | Isenberg |
| 4,729,931 A | 3/1988 | Grimble |
| 4,791,035 A | 12/1988 | Reichner |
| 5,002,647 A | 3/1991 | Tanabe et al. |
| 5,077,148 A | 12/1991 | Schora et al. |
| 5,103,871 A | 4/1992 | Misawa et al. |
| 5,169,730 A | 12/1992 | Reichner et al. |
| 5,169,731 A | 12/1992 | Yoshimura et al. |
| 5,188,910 A | 2/1993 | Ishihara et al. |

(Continued)

FOREIGN PATENT DOCUMENTS

| | | |
|---|---|---|
| DE | 3922673 | 1/1991 |
| DE | 19957641 | 1/2001 |

(Continued)

OTHER PUBLICATIONS

English translation of a Notification of First Office Action issued on Apr. 28, 2006 by The State Intellectual Property Office of the People's Republic of China in the Chinese counterpart application, Appln. No. 03804019.0.

(Continued)

*Primary Examiner* — Helen O Conley
(74) *Attorney, Agent, or Firm* — Knobbe, Martens, Olson & Bear LLP

(57) ABSTRACT

A plurality of tubular solid oxide fuel cells are embedded in a solid phase porous foam matrix that serves as a support structure for the fuel cells. The foam matrix has multiple regions with at least one property differing between at least two regions. The properties include porosity, electrical conductivity, and catalyst loading.

24 Claims, 11 Drawing Sheets

(56) References Cited

U.S. PATENT DOCUMENTS

| | | |
|---|---|---|
| 5,190,834 A | 3/1993 | Kendall |
| 5,244,752 A | 9/1993 | Zymboly |
| 5,273,837 A | 12/1993 | Aitken et al. |
| 5,273,838 A * | 12/1993 | Draper et al. ............ 429/466 |
| 5,302,319 A | 4/1994 | Wright et al. |
| 5,342,704 A | 8/1994 | Vasilow et al. |
| 5,354,626 A | 10/1994 | Kobayashi et al. |
| 5,380,600 A | 1/1995 | Hansen et al. |
| 5,385,700 A | 1/1995 | Denton |
| 5,411,767 A | 5/1995 | Soma et al. |
| 5,458,989 A | 10/1995 | Dodge |
| 5,518,827 A | 5/1996 | Matsumura et al. |
| 5,693,230 A | 12/1997 | Asher |
| 5,733,675 A | 3/1998 | Dederer et al. |
| 5,763,114 A | 6/1998 | Khandkar et al. |
| 5,807,642 A | 9/1998 | Xue et al. |
| 5,827,620 A | 10/1998 | Kendall |
| 5,895,573 A | 4/1999 | Scharstuhl |
| 5,908,713 A | 6/1999 | Ruka et al. |
| 5,932,368 A | 8/1999 | Batawi et al. |
| 5,935,727 A | 8/1999 | Chiao |
| 5,942,348 A | 8/1999 | Jansing et al. |
| 5,952,116 A | 9/1999 | Blum et al. |
| 5,976,721 A | 11/1999 | Limaye |
| 5,993,985 A | 11/1999 | Borglum |
| 5,993,989 A | 11/1999 | Baozhen et al. |
| 6,001,501 A | 12/1999 | Collie |
| 6,007,932 A | 12/1999 | Steyn |
| 6,017,646 A | 1/2000 | Prasad et al. |
| 6,051,173 A | 4/2000 | Fasano et al. |
| 6,051,330 A | 4/2000 | Fasano et al. |
| 6,074,771 A | 6/2000 | Cubukcu et al. |
| 6,080,501 A | 6/2000 | Kelley et al. |
| 6,093,297 A | 7/2000 | Tomura et al. |
| 6,099,985 A | 8/2000 | Elangovan et al. |
| 6,183,897 B1 | 2/2001 | Hartvigsen et al. |
| 6,194,335 B1 | 2/2001 | Crome et al. |
| 6,207,311 B1 | 3/2001 | Baozhen et al. |
| 6,214,490 B1 | 4/2001 | Pate |
| 6,217,822 B1 | 4/2001 | Borglum |
| 6,238,819 B1 | 5/2001 | Cahill et al. |
| 6,290,756 B1 | 9/2001 | Macheras et al. |
| 6,312,847 B1 | 11/2001 | Tsukuda et al. |
| 6,338,913 B1 | 1/2002 | Eshraghi |
| 6,383,350 B1 | 5/2002 | Sehlin et al. |
| 6,399,232 B1 | 6/2002 | Eshraghi |
| 6,403,248 B1 | 6/2002 | Eshraghi |
| 6,403,517 B1 | 6/2002 | Eshraghi |
| 6,423,436 B1 | 7/2002 | George et al. |
| 6,436,565 B1 | 8/2002 | Song et al. |
| 6,605,316 B1 | 8/2003 | Visco et al. |
| 6,709,782 B2 | 3/2004 | Keegan et al. |
| 6,824,907 B2 | 11/2004 | Sarkar et al. |
| 6,838,205 B2 | 1/2005 | Cisar et al. |
| 6,936,367 B2 | 8/2005 | Sarkar et al. |
| 2002/0028367 A1 | 3/2002 | Sammes et al. |
| 2002/0048699 A1 | 4/2002 | Steele et al. |
| 2003/0059668 A1 * | 3/2003 | Visco et al. ............ 429/44 |
| 2003/0134169 A1 | 7/2003 | Sarkar et al. |
| 2003/0134170 A1 | 7/2003 | Sarkar et al. |
| 2003/0134171 A1 | 7/2003 | Sarkar et al. |
| 2003/0134176 A1 | 7/2003 | Sarkar et al. |

FOREIGN PATENT DOCUMENTS

| | | |
|---|---|---|
| EP | 0 055 011 A | 6/1982 |
| EP | 0 424 673 A1 | 5/1991 |
| EP | 0451971 | 10/1991 |
| EP | 0678597 A1 | 10/1995 |
| EP | 0713931 A2 | 5/1996 |
| EP | 0896378 | 2/1999 |
| JP | 02 192665 A2 | 7/1990 |
| JP | 04237964 | 8/1992 |
| JP | 4248272 | 9/1992 |
| JP | 04 355059 A2 | 12/1992 |
| JP | 08 050914 A2 | 2/1996 |
| JP | 09-283161 | 10/1997 |
| JP | 10158894 | 6/1998 |
| JP | 11226370 | 8/1999 |
| JP | 2002-329508 | 11/2002 |
| WO | WO 99/17390 | 4/1999 |
| WO | WO 01/24300 A1 | 4/2001 |
| WO | WO 01/28011 A1 | 4/2001 |
| WO | WO 01/86030 | 11/2001 |
| WO | WO 02/15310 A3 | 2/2002 |
| WO | WO 03/069705 A3 | 8/2003 |

OTHER PUBLICATIONS

English translation of a Notice of Reasons for Rejection mailed on Nov. 25, 2008 by the Japanese Patent Office in the Japanese counterpart application, Appln. No. 2003-568716.

Notification of a Requisition mailed on Sep. 16, 2009 by the Canadian Intellectual Property Office in the Canadian Counterpart application, Appl. No. 2,475,906.

Letter dated Oct. 1, 2009 reporting Notification of Provisional Rejection from the Korean Intellectual Property Office dated Sep. 22, 2009 in Korean counterpart application, Appln. No. 2004-7012675.

* cited by examiner

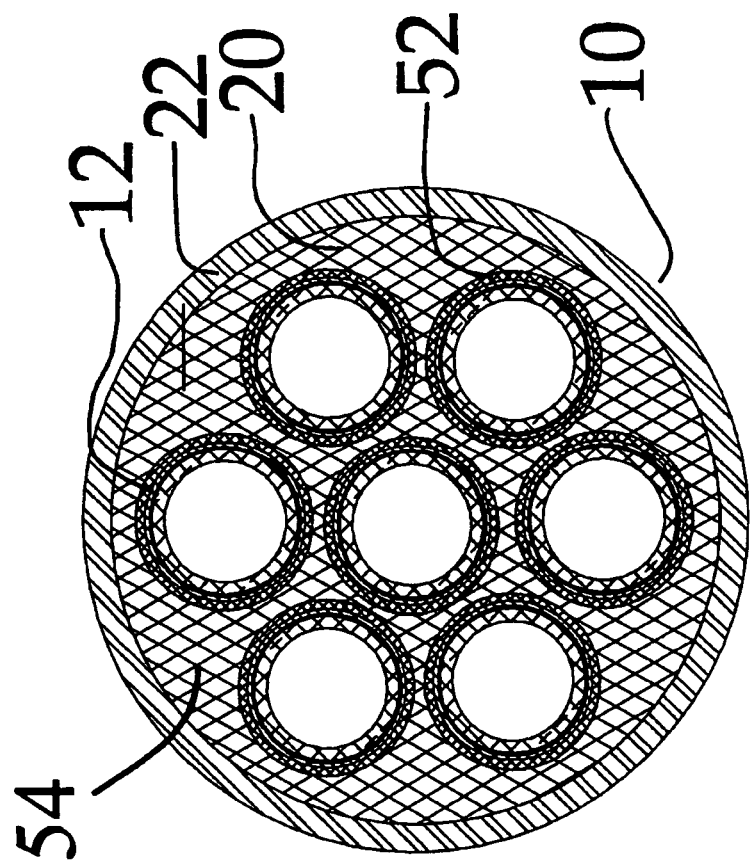
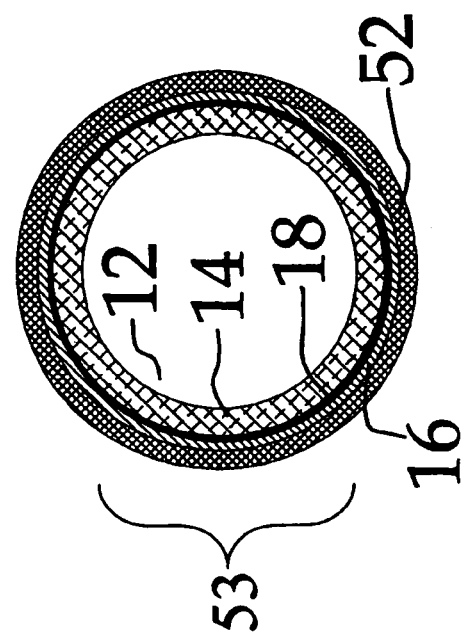

FUEL CELL SUPPORT STRUCTURE

RELATED APPLICATIONS

This application is a continuation-in-part (CIP) of U.S. application Ser. No. 10/504,624 and which is incorporated herein by reference in its entirety and for all teachings, disclosures and purposes.

FIELD OF THE INVENTION

This invention relates generally to fuel cells and in particular to an improved support structure for the fuel cells.

BACKGROUND OF THE INVENTION

In general, a solid oxide fuel cell (SOFC) comprises a pair of electrodes (anode and cathode) separated by a ceramic, solid-phase electrolyte. To achieve adequate ionic conductivity in such a ceramic electrolyte, the SOFC operates at an elevated temperature, typically in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction: $H_2 + O^= \rightarrow H_2O + 2e^-$ $CO + O^= \rightarrow CO_2 + 2e^-$ $CH_4 + 4O^= \rightarrow 2H_2O + CO_2 + 8e^-$ Cathode reaction: $O_2 + 4e^- \rightarrow 2O^=$ Known SOFC designs include planar and tubular fuel cells. Applicant's own PCT application no. PCT/CA01/00634 discloses a method of producing a tubular fuel cell by electrophoretic deposition (EPD). The fuel cell comprises multiple concentric layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube.

In certain commercial applications, it is desirable to provide a fuel cell system having a relatively high power density, i.e. a fuel cell system that provides a high power-to-volume ratio. Such high power densities may be achieved by assembling multiple tubular fuel cells in close proximity to each other to produce a fuel cell stack. Also, higher power densities can be achieved by increasing the active surface area per unit volume of the system; for example, the active surface area per unit volume can be increased by decreasing the diameter of each tubular fuel cell, thereby increasing the number of fuel cells that can be stacked in a given volume. Such small-diameter fuel cells, especially if made of ceramic or some of its composites, can be fragile and relatively vulnerable to damage when assembled into a tightly packed array. Thin walled elongate ceramic structures tend to be particularly fragile, and may fail when subjected to bending forces or vibrations that exceed the fracture stress of the ceramic.

SUMMARY OF THE INVENTION

An objective of the invention is provide an improved support structure for solid oxide fuel cells, especially small diameter tubular elongate SOFC closely packed together in a stack. Such a support structure should provide mechanical support, protect against external vibration and shock, electrically interconnect one or more fuel cells in the stack, and pass reactant through the stack and to each fuel cell.

One aspect of the invention that provides a solution to at least some of these objections is a solid oxide fuel cell stack comprising at least one tubular solid oxide fuel cell and a matrix in which the at least one fuel cell is embedded. Each tubular solid oxide fuel cell comprises a tubular inner electrode layer, a tubular outer electrode layer, and a tubular electrolyte layer sandwiched between the inner and outer electrode layers. The matrix has multiple solid phase porous regions wherein at least one of porosity, catalytic loading, and electrical conductivity are different between a first and second matrix region.

The first and second matrix regions can be solid phase porous foams. In such case, the first matrix region can be electrically conductive and the second matrix region electrically insulating. Further, the first matrix region composition can include a material selected from a group of electrically conductive materials consisting of lanthanum strontium manganate (LSM); lanthanum strontium ferrite (LSF); lanthanum strontium cobalt ferrite (LSCF); samarium strontium cobaltite (SSC); $LaCr(Mg)O_3$, doped $LaCrO_3$ ($La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$); 316 and 316L stainless steels; and oxide and carbide ceramics. Other suitable materials for the matrix include Inconel steel; super alloy; ferritic steel; silver and its alloys such as: silver-copper-palladium alloys, silver-palladium alloys, silver-palladium-platinum alloys, silver-gold-platinum alloys, and silver-gold-palladium alloys; gold and gold alloys; copper and copper alloys; and, cermets containing these materials. Further, cermets such as Ni-Yttria stabilized zirconia or any Ni and doped zirconia cermet, Ni and doped—$CeO_2$ cermet, and Cu and doped-ceria cermet are suitable materials for the matrix 20 when the outer electrode of the fuel cell(s) is an anode.

The second matrix region composition can include a material selected from a group of electrically insulating materials consisting of oxide ceramics, carbide ceramics, and nitride ceramics. Specifically, this material can be selected from the group consisting of alumina, mullite, silicon nitride, and aluminum nitride. Also, the composition of the first or second matrix regions can include a material selected from a group of high emissitivity materials consisting of surface oxidized steel, super alloys and bulk SiC, LSM, and LSCF.

When the outer electrode is a cathode, the first matrix region can be electrically conductive, contact the cathode, and be coated with a catalytic material that promotes oxygen ionization electrochemical reaction or catalytically burns a fuel-oxidant mixture. In particular, the catalytic material can be selected from the group consisting of LSM, LSF, LSCF, Pt, Pd, Pt—Pd, Pt-alloys, and Pd-alloys.

When the outer electrode is an anode, the first matrix region can be electrically conductive contact the anode, and be coated with a catalyst material that promotes a fuel reforming reaction. In particular, the catalytic material can be selected from the group consisting of Cu/ZnO alloys, Ni and its alloys, Pt and its alloys, and Pd and its alloys. This first matrix region can be further coated with a catalyst material that promotes an electrochemical reaction.

Whether the outer electrode is an anode or electrode, the second matrix region can also be coated with a catalyst material, but at a lower loading than the catalyst coating on the first matrix region.

The first matrix region can be a tubular solid state porous foam layer surrounding at least one fuel cell, and the second matrix region can be a solid state porous foam support structure in which the first matrix region is embedded. The first and second matrix regions can be bonded at their interface by a bonding phase. The porosity of the second matrix region can be greater than the porosity of the first matrix region. Also, the first matrix region can be electrically conductive and the second matrix region be electrically insulating. When the stack comprises multiple fuel cells, some of the fuel cells can be surrounded by the first matrix region, and at least some of the remaining fuel cells can be surrounded by the second matrix region. In such case, the first matrix region can be electrically insulating and the second matrix region be electrically conductive.

Alternatively, the matrix can comprise an electrically insulating solid phase porous foam base structure partially coated with an electrically conductive material, such that uncoated portions of the base structure form an electrically insulating first matrix region, and the coated portions of the base structure form an electrically conductive second matrix region.

According to another aspect of the invention, a fuel cell assembly comprises a plurality of tubular solid oxide fuel cell subassemblies each comprising a tubular inner electrode layer, a tubular outer electrode layer, a tubular electrolyte layer sandwiched between the inner and outer electrode layers, and a tubular solid phase porous foam layer surrounding the outer electrode layer. The foam layer contacts the foam layer of at least one adjacent subassembly. The foam layers collectively form a matrix in which the fuel cells are embedded and at least one of catalyst loading, porosity and electrical conductivity of at least two of the foam layers is different. Further, at least some of the subassemblies can be embedded in a solid phase porous foam matrix having at least one of porosity, catalyst loading and electrical conductivity that is different than at least one of the foam layers.

BRIEF DESCRIPTION OF THE DRAWINGS

FIG. 4 is a schematic end view of a fuel cell subassembly comprising a tubular fuel cell surrounded by a solid phase porous foam layer.

FIG. 5 is a schematic end view of a fuel cell stack comprising a plurality of the fuel cell subassemblies shown in FIG. 4 embedded in a solid phase porous foam support matrix.

DETAILED DESCRIPTION OF EMBODIMENTS OF THE INVENTION

Definitions

When describing the present invention, the following terms have the following meanings, unless indicated otherwise. All terms not defined herein have their common art-recognized meanings.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and non-oxide compounds including but not limited to carbides (such as of titanium tungsten, boron, silicon), sulicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yttria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

The term "hollow inorganic membrane (HIM)" refers to a tubular body comprising an inorganic material. The cross-sectional geometry may be any shape such as circular, square, rectangular, triangular, and polygonal. The longitudinal geometry of the tubular body may be any shape such as elongate, serpentine, and coiled. The membrane may be porous or non-porous. The inorganic material includes metal, cermet composite, ceramic, and ceramic—ceramic composites.

The term "porous" in the context of hollow ceramic, metal, and cermet membranes and matrices means that the ceramic material contains pores (voids). Therefore, the density of the porous membrane material is lower than that of the theoretical density of the material. The voids in the porous membranes and matrices can be connected (i.e., channel type) or disconnected (i.e. isolated). In a porous hollow membrane or matrix, the majority of the pores are connected. To be considered porous as used herein in reference to membranes, a membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

Single Region Matrix

Figure 1:
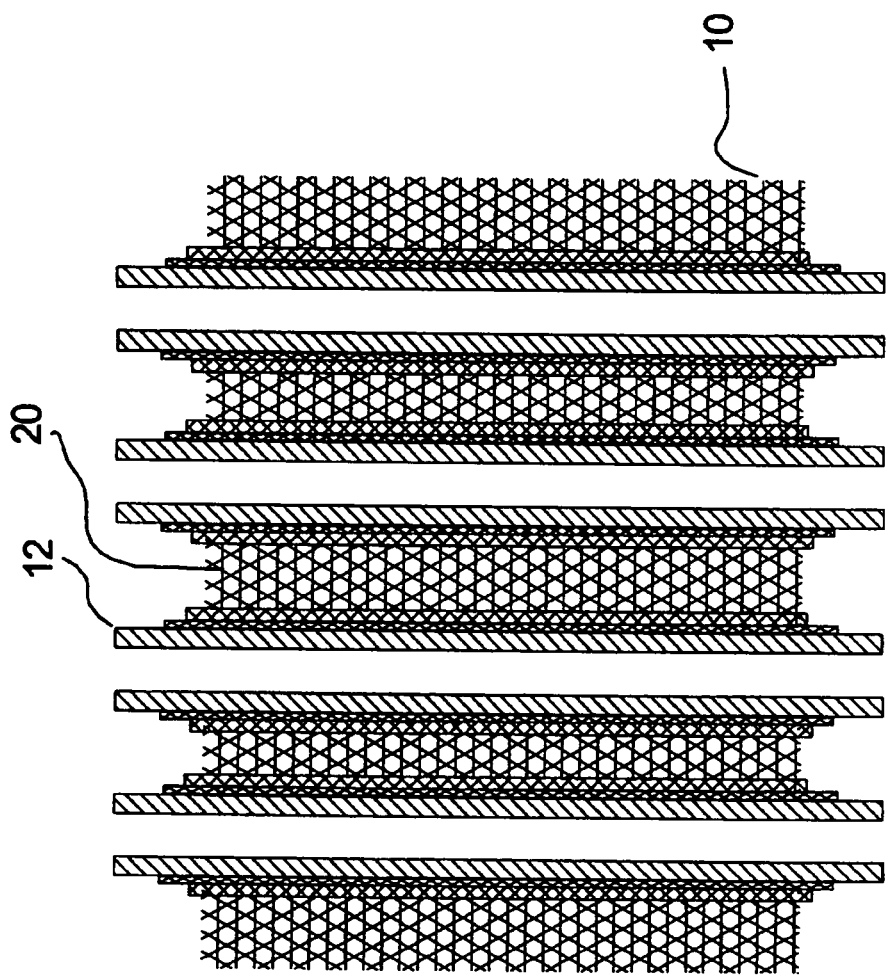
FIG. 1 is a schematic side cut-away view of a stack of fuel cells stacked together and embedded in a solid phase porous foam matrix.
Figure 2:
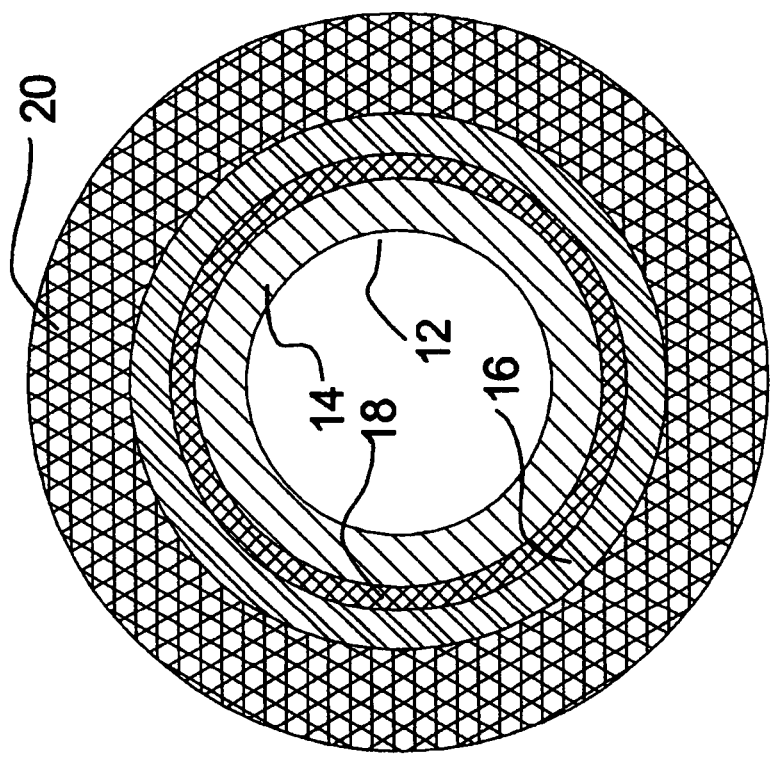
FIG. 2 is a schematic end view of one tubular fuel cell embedded in the foam matrix.

Referring to FIG. 1, and according to one embodiment of the invention, a fuel cell stack 10 includes a plurality of tubular solid oxide fuel cells 12 wherein each fuel cell 12 is arranged side-by-side with each other. Referring to FIG. 2, each fuel cell 12 comprises three concentric hollow inorganic membranes (HIM) that are in continuous contact with each other to form a multi-layered structure. The inner and outer membranes 14, 16 serve as anode and cathode electrodes, and the middle membrane 18 serves as an electrolyte. The electrodes 14, 16 may have sublayers, e.g. each cathode and anode may comprise a first layer wherein most of the electrochemical reaction takes place ("functional layer" and/or "electrocatalytically active layer"), and a second layer, which inter alia, provides structural support to the functional layer. A description of the structure and manufacture of such fuel cells 12 for the stack 10 are disclosed in Applicant's prior applications PCT CA03/00059 and PCT CA03/00216.

Figure 3:
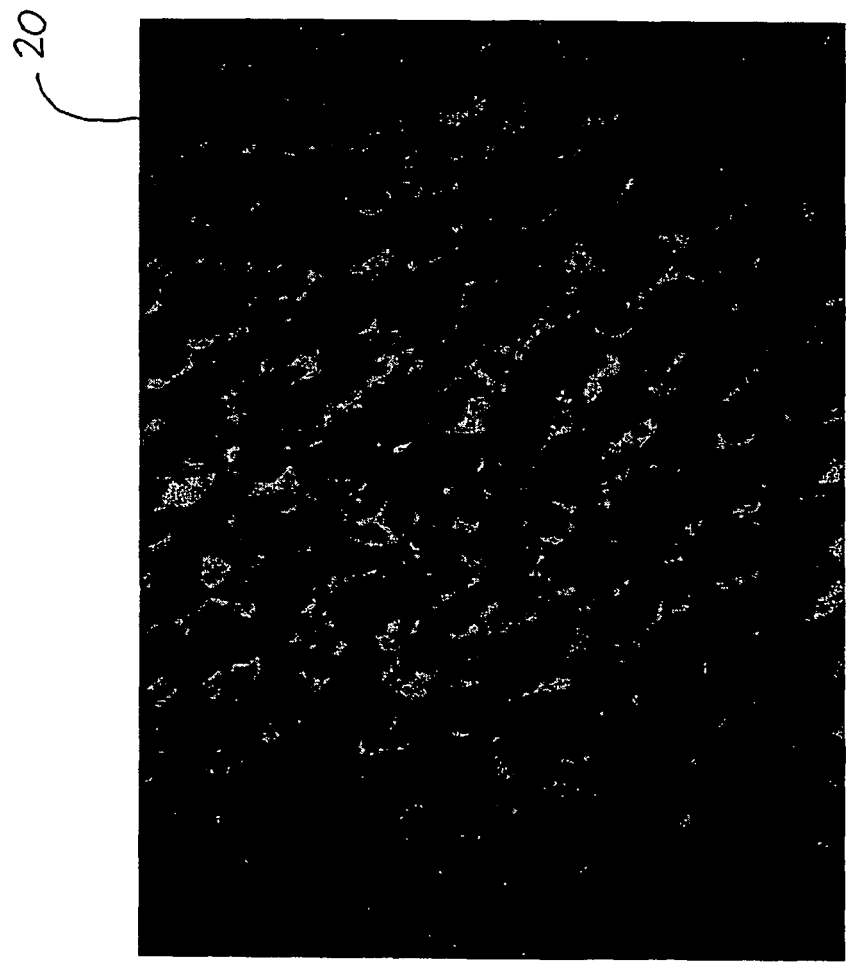
FIG. 3 is an SEM micrograph of the foam matrix microstructure.

Referring to FIGS. 1, 2 and 3, the fuel cells 12 are embedded in a solid phase porous foam material 20 ("matrix") that inter alia, serves as a support structure for the fuel cells 12. The matrix 20 is composed of ceramic and/or other materials that are able to withstand typical SOFC operating temperatures and provide suitable structural support. Preferably, the matrix 20 composition includes at least 60% LSM to enable it to operate at up to around 1000° C. This material also enables the matrix 20 to serve as a cathode, i.e. to collect current, to ionize oxygen into oxide ions, and to conduct these ions to the electrolyte. The matrix 20 fills the spaces between the fuel cells 12 and contacts the outer surface of each fuel cell 12, i.e. the cathode layer 16 of each fuel cell 12. Because the matrix 20 is of the same material as the cathode layer 16, the matrix 20 serves to increase the effective surface area of the cathode 16, thereby increasing the area for collecting electrons and ionizing oxygen.

The matrix 20 is porous with most of the pores being channel-type connected pores to allow the flow-through of oxidant through the stack 10, and to the cathode layer 16 of each fuel cell 12. The porosity of the matrix 20 is selected to provide a sufficient oxidant flow-through rate for the electrochemical reaction and sufficient mechanical strength to serve as a support structure for the fuel cell stack 10. In this connection, the matrix 20 has a porosity of between 10-95% and preferably about 60% (see the SEM micrograph of the foam matrix microstructure in FIG. 3).

Although the matrix 20 in this embodiment is substantially composed of LSM, the matrix 20 composition can alternatively include other materials. For example, the matrix 20 can be substantially composed of a suitable electronic or mixed (electronic and ionic) conductive porous solid state material, if it is desired for the matrix 20 to be electronically and/or ionically conductive. The specific % material composition required for the matrix 20 to be electronically and/or ionically conductive depends on the material and can be readily determined by one skilled in the art. For example, suitable materials for the matrix 20 include: lanthanum strontium ferrite (LSF); lanthanum strontium cobalt ferrite (LSCF); samarium strontium cobaltite (SSC); $LaCr(Mg)O_3$, doped $LaCrO_3$ ($La_{1-x}Sr_xCrO_3$, $La_{1-x}Ca_xCrO_3$, $LaCr(Mg)O_3$, $LaCa_{1-x}Cr_yO_3$); stainless steels such as 316, 316L; SiC; $MoSi_2$; and oxide or carbide ceramics. Other suitable materials for the matrix 20 include Inconel steel; super alloy; ferritic steel; silver and its alloys such as: silver-copper-palladium alloys, silver-palladium alloys, silver-palladium-platinum alloys, silver-gold-platinum alloys, and silver-gold-palladium alloys; gold and gold alloys; copper and copper alloys; and, cermets containing these materials. Further, cermets such as Ni-Yttria stabilized zirconia or any Ni and doped zirconia cermet, Ni and doped-$CeO_2$ cermet, and Cu and doped-ceria cermet are suitable materials for the matrix 20 when the outer electrode of the fuel cell(s) 12 is an anode.

As an electronic conductor, the matrix 20 can carry electricity by electron transportation, e.g. metals. As a mixed conductor, the matrix 20 can carry electricity by electron and ion transportation; suitable material:: for a mixed conductor matrix 20 include LSM, LSF, LSCF and metal/ceramic composites. As an ionic conductor, the matrix 20 can carry electricity by ion transportation; a suitable material for an ionic conducting matrix 20 is Yttria-doped zirconia, tri- or di-valent cation doped cerium or zirconium oxide. "Electrical conductivity" as used herein means electronic and/or ionic conductivity.

For the purpose of temperature uniformity, the matrix 20 can be made from high emissivity materials of emissivity >0.7, typically around 0.9. Some suitable high emissivity materials include: surface oxidized steel, super-alloys and bulk SiC, LSM, and LSCF. Alternatively, the matrix 20 can comprise a base structure made of low emissivity materials and coated with a high emissivity material. In this case the high emissivity coating volume will be <30%.

Optionally, the matrix 20 can made of or coated with electrically insulating materials to alter the electrical conductivity characteristics throughout the matrix 20 or in selected parts of the matrix 20. When the matrix 20 is to be partially or wholly electrically insulating, the matrix 20 can be made partly or wholly with a suitable electrically insulating material, such as those materials selected from the group of insulating materials consisting of oxide ceramics, carbide ceramics, and nitride ceramics. Exemplary insulating materials include alumina, mullite, silicon nitride, and aluminum nitride.

By assembling a plurality of fuel cells 12 into the stack 10, commercially useful electrical power levels may be achieved. When the entire matrix 20 is electrically conductive, each of the fuel cells 12 contacting the matrix 20 are effectively electrically connected in parallel to each other, such that the effective voltage of the stack 10 is equal to the voltage of the single cell 12 with the highest voltage and the effective current of the stack 10 is the additive sum of the current produced by each fuel cell 12. As will be discussed later, different regions of the matrix 20 can have different degrees of electrical conductivity. For example, one or more fuel cells 12 can be surrounded by an electrically insulating matrix region that electrically isolates these fuel cells 12 from the electrically conductive portions of the stack 10, thereby enabling these fuel cells 12 to be electrically coupled in series instead of in parallel.

Multiple Region Matrix

The conductive matrix 20 as shown in FIGS. 1, 2, and 3 has uniform properties throughout and can be manufactured and joined with the fuel cells 12 to form the stack 10 according to the methods described in Applicant's prior application PCT CA03/00216. The structure and manufacture of a stack having a matrix 20 with multiple regions of differing properties such as electrical conductivity, porosity, and catalyst loading are described below.

The matrix 20 can have multiple regions in which certain properties of one region differ from certain properties of another region. One approach to creating these multiple regions is shown in FIGS. 4 and 5. In this embodiment, each tubular fuel cell 12 is surrounded by a tubular layer of matrix material 52 ("tubular matrix region") to form a fuel cell subassembly 53. The subassemblies 53 are then embedded in additional supporting matrix material 54 ("supporting matrix region") that has one or more different physical, chemical or electrical properties than the tubular matrix region 52, such as a different porosity and/or catalyst loading and/or electrical conductivity. The supporting matrix region 54 serves to provide mechanical support to the stack 10, provide protection from mechanical vibration, and provide good temperature distribution and fluid distribution within the stack 10. Collectively, the tubular matrix region 52 and supporting matrix region 54 form the matrix 20.

Porosity

The porosity can be different between the tubular and supporting matrix regions 52, 54. The porosity of the tubular matrix region 52 is selected to balance the need for good reactant access to the reaction areas (higher porosity) and good electrical conductivity (lower porosity) Preferably, the porosity of the supporting matrix region 54 is greater than the porosity of the first matrix region 52, as its primary purpose is to provide mechanical support rather than conduct electricity. The higher porosity in the supporting matrix region 54 provides a better flow path thereby reducing pressure drop and improving reactant and reactant product access to and from the reaction zones, lower density thereby reducing overall system weight, and greater flexibility as a result of a smaller cross-section of matrix ligaments. The greater flexibility improves the supporting matrix region's 54 ability to absorb mechanical shock.

There are a number of different ways to obtain different porosities between the two matrix regions 52, 54. For example, different foaming agents in the slurries can be used to form each matrix region 52, 54. Additionally or alternatively, different porosities can be obtained by using different sized combustible additives (i.e., pore former) in the slurries. Also, the degree of porosity can be varied by varying the amount of combustible additives between slurries. Pore size distribution can also be controlled by controlling the combustible particles size distribution within each matrix region 52, 54. Further, varying the particle size of the starting matrix materials can be used to vary the porosity between matrix regions 52, 54. For example, LSM can be the matrix material for both matrix regions 52, 54, wherein the two matrix regions 52, 54 are sintered at a temperature of 1200° C. for two hours. The tubular matrix region 52 can comprise LSM powder having an average particle size of 1 μm, and the supporting matrix region 54 can comprise LSM powder having an average particle size of 10 μm. Since the LSM particle size of the supporting matrix region 54 is larger, the sinterability of the supporting matrix region 54 is lower. Thus, when both matrix regions 52, 54 are sintered, the supporting matrix region 54 will have a higher porosity than the tubular first matrix region 52. Manufacture of pores in the matrix 20 are described in detail in Applicant's application no. PCT/CA03/00216.

Catalyst Loading

The catalyst loading can be different between the tubular and supporting matrix regions 52, 54. For example, one or both of the tubular and supporting matrix regions 52, 54 can be partially or completely coated with one or more types of catalyst material as is known in the art. Also, catalyst concentration can vary from place to place within the tubular and/or supporting matrix regions 52, 54. When the outer electrode of the fuel cell 12 is the cathode 16, and the tubular matrix region 52 is electrically conductive, the tubular matrix region 52 can be coated with a catalyst that promotes an oxygen ionization electrochemical reaction, or can be coated with a catalyst that catalytically burns a fuel-oxidant mixture to produce heat during stack start-up. Such catalytic material is well known in the art and includes LSM, LSF, LSCF, Pt, Pd, Pt—Pd, Pt-alloys, and Pd-alloys. LSM, LSF and LSCF are good cathode materials that promote cathode reactions. Pt, Pd, Pt—Pd, Pt alloys and Pd alloys are good catalyst materials for promoting catalyst burning, as well as good cathode and anode materials.

The catalyst material can be deposited on the matrix regions 52, 54 by catalyst coating methods as known in the art, such as dip-coating, spraying, and soaking the matrix surface with catalyst solution. The coating steps may be repeated several times to increase catalyst loading. After coating and drying, the coated matrix regions 52, 54 are heat treated at the lowest possible temperature to sufficiently decompose any salt and organic material present; high heat treatment temperatures tend to coarsen the catalytic coating and reduce catalytic performance. A suitable heat temperature is around an SOFC operating temperature.

In catalytic burning, fuel is mixed with oxidant such as air to produce an oxygen-rich mixture. The mixture is passed through the tubular matrix region 52; the fuel in the mixture will catalytically lean burn and produce heat. Once the stack 10 is heated and the fuel cells 12 are operating, the fuel supply to the tubular matrix region 52 will be stopped, and catalytic burning will end. As the tubular matrix region 52 is coated with catalytic burning material, fuel will burn very near the fuel cells 12 and thus the fuel cells 12 should heat up quickly. Additionally, the supporting matrix region 54 can also be coated with catalytic material, albeit at a lower concentration than at the tubular matrix region 52, so that the entire stack 10 is heated with a concentration of heating occurring around the fuel cells 12. Optionally, the catalyst loading can be varied within one or both of the matrix regions 52, 54 to produce a custom temperature distribution in the stack 10.

When the outer electrode of the fuel cell 12 is an anode, fuel can be reformed at one or both of the matrix regions 52, 54 by partial oxidation, steam reforming, or auto-thermal reforming. In such case, one or both of the matrix regions 52, 54 are fully or partially coated with a suitable reforming catalyst material by preferential coating. Such catalyst material is well known in the art and include Cu/ZnO, Ni-based, Pt and its alloys, Pd and its alloys. The reforming catalyst material concentration can be varied within the two matrix regions 52, 54 to promote a customized temperature and fuel distribution within the stack 10. In addition to the reforming catalyst material, one or both of the matrix regions 52, 54 can be coated with catalyst material for promoting electrochemical reaction; such catalyst material is well known in the art and include Pt and its alloys and Pd and its alloys.

Electrical Conductivity

One or more of the tubular matrix regions 52 can be made from one or more of the electrically conductive and/or insulating materials described above such that the electrical conductivity of some of the tubular matrix regions 52 is different than the electrical conductivity of the other tubular matrix regions 52. Additionally or alternatively, the supporting matrix region 54 can be made from one or more of the electrically insulating and/or conductive materials described above such that the electrical conductivity of the supporting matrix region 54 is different from the electrical conductivity of one or more of the tubular matrix regions 52.

For example, the supporting matrix region 54 can be composed of one or more electrically insulating materials selected from the group of oxide-ceramics, nitride ceramics, and carbide ceramic, e.g. alumina, zirconia, spinel oxides, MgO, mullite, silica, and $TiO_2$. The specific % material composition required for the supporting matrix region 54 to be electrically insulating depends on the material and can be readily determined by one skilled in the art. In such case, the supporting matrix region 54 serves to electrically isolate each fuel cell 12 embedded in the matrix 20.

Alternatively, the supporting matrix region 54 can be a composite structure comprising different insulating materials, or a composite structure comprising electrically insulating and electrically conductive materials, wherein the insulating material(s) is a continuous phase and the conductive material(s) is a non-continuous or disconnected phase which causes the entire structure to exhibit electrically insulating characteristics. Such a mixed matrix can be manufactured from a slurry having a mixture of electrically conducting an electrically insulating materials wherein the amount of electrically conducting materials is below the percolation limit of the matrix.

Alternatively, the tubular matrix region 52 can be composed of an electrically conductive material and be surrounded by another layer of matrix material composed of an electrically insulating material, thereby forming a bi-layered assembly (not shown). The insulating outer matrix layer can be made from a suitable electrically insulating materials such as alumina, silica, or magnesia in accordance with the methods disclosed in Applicant's application PCT/CA03/00216. Such a bi-layer assembly provides efficient current collection, introduces some mechanical stability and protects the fuel cells 12 from the surroundings; each cell 12 is electrically isolated and enables the cells 12 to be connected either in series or parallel according to the specific design need.

In yet another alternative embodiment (not shown), only some of the fuel cells 12 are surrounded by the tubular matrix region 52, and the tubular and supporting matrix regions 52, 54 are manufactured with different electrical conductivities. For example, the tubular matrix regions 52 are electrically insulating, and the supporting matrix region 54 is electrically conductive. The fuel cells 12 not surrounded by the tubular matrix regions 52 directly contact the supporting matrix region 54 and will thus be electrically coupled together in parallel. The fuel cells 12 surrounded by the tubular matrix regions 52 are electrically isolated from each other but can be electrically coupled together in series or in parallel if so desired. Also they can be divided in subgroups and can be connected in series or parallel.

In a further alternative embodiment (not shown), the matrix 20 has an electrically insulating base structure partially coated with an electrically conductive material. The uncoated portions of the matrix 20 serve as a first matrix region and is electrically insulating; the coated portions of the matrix 20 serve as a second matrix region and are electrically conductive. Such an arrangement can be particularly useful to electrically couple only certain fuel cells 12 in the stack, i.e. by contacting these fuel cells 12 with the coated portions. The base structure composition can include one or more of the electrically insulating materials described above, and the composition of the electrically conductive coatings can include one or more of the electrically conductive materials described above.

Manufacture

The tubular matrix region 52 can be made by the methods disclosed in Applicant's previous application PCT CA03/00216. This application discloses forming a slurry and coating the fuel cells 12 with the slurry; depending on the desired catalytic, porosity and electrical conductivity properties desired, the slurry can have a composition based on LSM, LSF, LSCF, a Fe-based super alloy, samarium strontium cobaltite (SSC); LaCr(Mg)O$_3$ doped LaCrO$_3$ (La$_{1-x}$Sr$_x$CrO$_3$, La$_{1-x}$Ca$_x$CrO$_3$, La$_{1-x}$Mg$_x$CrO$_3$, LaCr(Mg)O$_3$, LaCa$_{1-x}$Cr$_y$O$_3$); stainless steels such as 316, 316L; oxide or carbide ceramics; cermets such as Ni-Yttria stabilized zirconia or any Ni and doped zirconia cermet, Ni and doped-CeO$_2$ cermet, and Cu and doped-ceria cermet; Inconel steel or any super alloy; ferritic steel; SiC; MoSi$_2$; silver and its alloys such as: silver-copper-palladium alloys, silver-palladium alloys, silver-platinum alloys, silver-palladium-platinum alloys, silver-gold-platinum alloys, and silver-gold-palladium alloys; gold and gold alloys; and, copper and copper alloys.

The slurry coating may be applied by dip-coating or spraying or other suitable known means. Then, the slurry-coated fuel cells 12 are allowed to dry, and sintered according to the sintering steps described in PCT/CA03/00216, such that multiple matrix-coated fuel cell subassemblies 53 are formed.

The supporting matrix region 54 can be formed by first pouring a slurry into a container (not shown), then inserting one or more combustible rods (not shown) in the slurry. The rods have generally the same diameter as the matrix-coated fuel cell subassembly 53. The slurry composition of the supporting matrix region 54 can be different than the slurry composition for the tubular matrix region 52 to produce two matrix regions 52, 54 with different properties. Alternatively or additionally, the two matrix regions 52 and 54 can be made from same materials but have different porosities e.g., the supporting matrix region 54 can have a higher porosity than the tubular matrix region 52.

The slurry and rods are then dried and sintered according to the steps described in Applicant's prior application PCT CA03/00216, and the rods burn away, leaving behind the porous supporting matrix region 54 with channels corresponding to the burned-away rods. Then, the matrix-coated fuel cell subassemblies 53 are inserted into the channels. If the fuel cell 12 is not securely embedded in the channel, a bonding agent such as additional slurry may be poured between the fuel cell and the channel, and an additional drying and sintering step can be carried out to solidify the slurry and fasten the fuel cell 12 in place. Optionally, some of the channels can be used as gas distribution channels for promoting the flow of reactant through the stack.

Additional Embodiments

Figure 6:
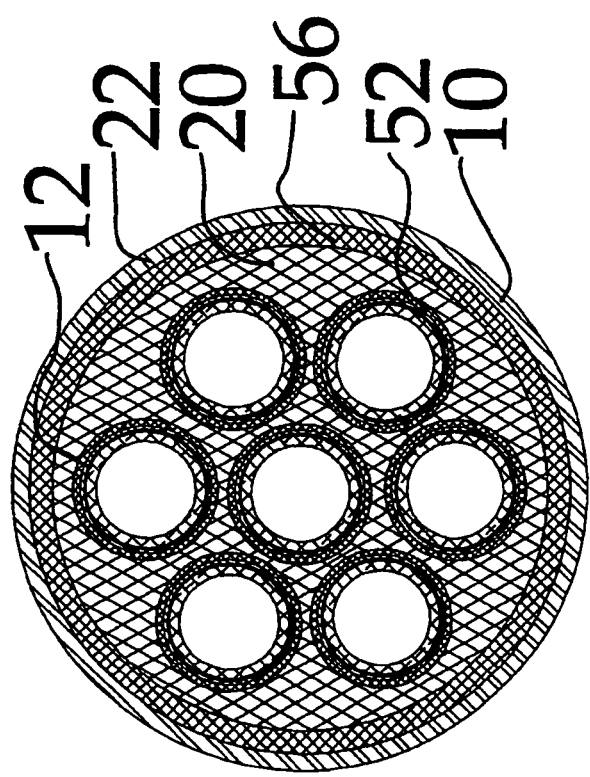
FIG. 6 is a schematic end view of the fuel cell stack of FIG. 5 modified to include a tubular solid state porous foam buffer layer surrounding the support matrix.

According to another embodiment of the invention, and referring now to FIG. 6, the matrix 20 is provided with a third matrix region 56 that serves as a buffer layer against mechanical shock ("buffering matrix region"). The buffering matrix region 56 is a layer of matrix material surrounding the supporting matrix region 54 and can be made of a solid phase porous foam, or a metal mesh. When the buffering matrix region 56 is a solid foam, it is manufactured according to the methods taught in Applicant's application no. PCT/CA03/00216 and applied onto the supporting matrix region 54 by dipping, painting, spraying. Also, flexible foam materials can be wrapped around the supporting matrix region 54. Alternatively, bulk foam material can be machined into an appropriate shape and geometry and inserted around the supporting matrix region 54. When the buffering matrix region 56 is a metal mesh, the mesh can be wrapped around the supporting matrix region 54. The buffering matrix region 56 is particularly useful to provide mechanical shock protection when the supporting matrix region 54 is made of a brittle insulating ceramic material.

According to another alternative embodiment of the invention, the buffering matrix region 56 can be applied to fuel cell stacks (not shown) that are not embedded in a matrix 20. The fuel cells of such stacks can be stacked together using other techniques as known in the art, e.g. by spacers. The buffering matrix region surrounds the fuel cells of the stack and serves as a buffer layer against mechanical shock.

Figure 7:
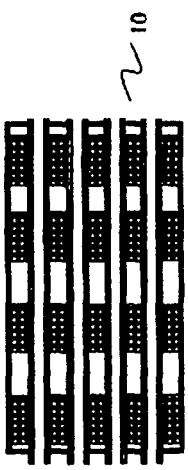
FIG. 7 is a schematic cut-away side view of the fuel cell stack of FIG. 6 further modified so that the support matrix is discontinuous along the length of the stack.

Optionally, and referring to FIG. 7, the three matrix regions 52, 54, 56 are discontinuous in the longitudinal direction of the stack 10. Gaps 57 are provided at longitudinal intervals to reduce the amount of matrix material, thereby reducing materials cost and stack weight. The gaps 57 can be created by masking the parts of the fuel cells 12 where the gaps 57 are to be formed.

Figure 8:
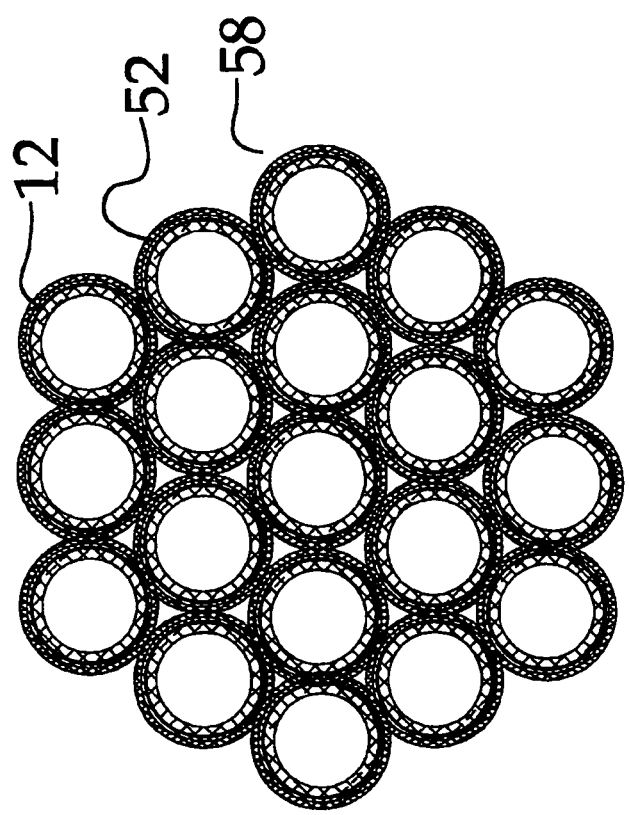
FIG. 8 is a schematic end view of a plurality of the fuel cell subassemblies of FIG. 4 positioned in a side-by-side close-packed arrangement.

Referring to FIG. 8 and according to another embodiment of the invention, multiple matrix-coated fuel cell subassemblies 53 are placed in a close-packed side-by-side arrangement to form a fuel cell cluster 58. The tubular matrix region 52 of each subassembly 53 is placed in physical contact with the tubular matrix region 52 of one or more adjacent subassemblies 53; therefore, the contacting matrix layers 52 collectively form a continuous matrix 20 throughout the cluster 58. Empty space between subassemblies 53 can be used as reactant feed channels. The tubular matrix regions 52 of the subassemblies 53 can be entirely electrically insulating or entirely conductive. When electrically conductive, all the fuel cells 12 contacting these matrix layers are electrically coupled in parallel. When the tubular matrix regions 52 are electrically insulating, the fuel cells 12 surrounded by these tubular matrix regions 52 are electrically insulated from each other and can be electrically coupled in series if so desired. Alternatively, some of the matrix layers of some of the subassemblies 53 can be electrically insulating, and the tubular matrix regions 52 of the other sub-assemblies 53 can be electrically conductive. When two subassemblies 53 both having electrically conductive matrix layers are placed in physical contact with each other, an electrically conductive pathway is established therebetween. In this sense, the electrically conductive tubular matrix regions 52 are considered a "first matrix region" and the electrically insulating tubular matrix regions 52 are considered a "second matrix region" of the matrix 20.

By selectively arranging electrically conductive matrix regions 52 amongst the electrically insulating subassemblies 53, it is possible to customize the series-parallel electrical connections of the fuel cells 12. Also, the first and second matrix regions in this embodiment can have other differing properties, such as porosity and catalyst loading/distribution. Further, additional matrix regions can be provided having different properties (not shown).

Figure 9:
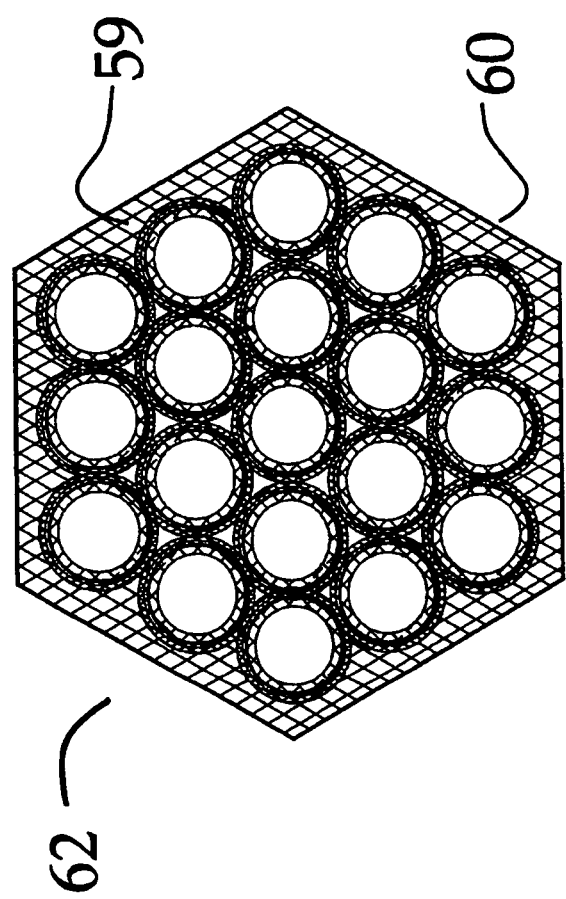
FIG. 9 is a schematic end view of the close-packed fuel cells of FIG. 8 embedded in the support matrix and surrounded by a container wall to form a first fuel cell sub-stack.

Referring now to FIG. 9, and according to yet another embodiment of the invention, the fuel cell cluster 58 shown in FIG. 8 can be embedded in a matrix support structure 59. A container wall 60 surrounds the matrix support structure 59. The fuel cell cluster 58, matrix support structure 59, and container wall 60 collectively form a fuel cell sub-stack 62. The container wall 60 can be made of an electrically insulating material to electrically isolate the sub-stack 62, or made of an electrically conductive material to serve as a current collector for the sub-stack 62. The matrix support structure 59 can be electrically insulating or conductive, and can be coated with a catalytic material, e.g. for catalytic burning or fuel reforming. When electrically conductive, the matrix support structure 59 can be used as a current collector for the fuel cells 12 in the sub-stack 62.

Figure 10A:
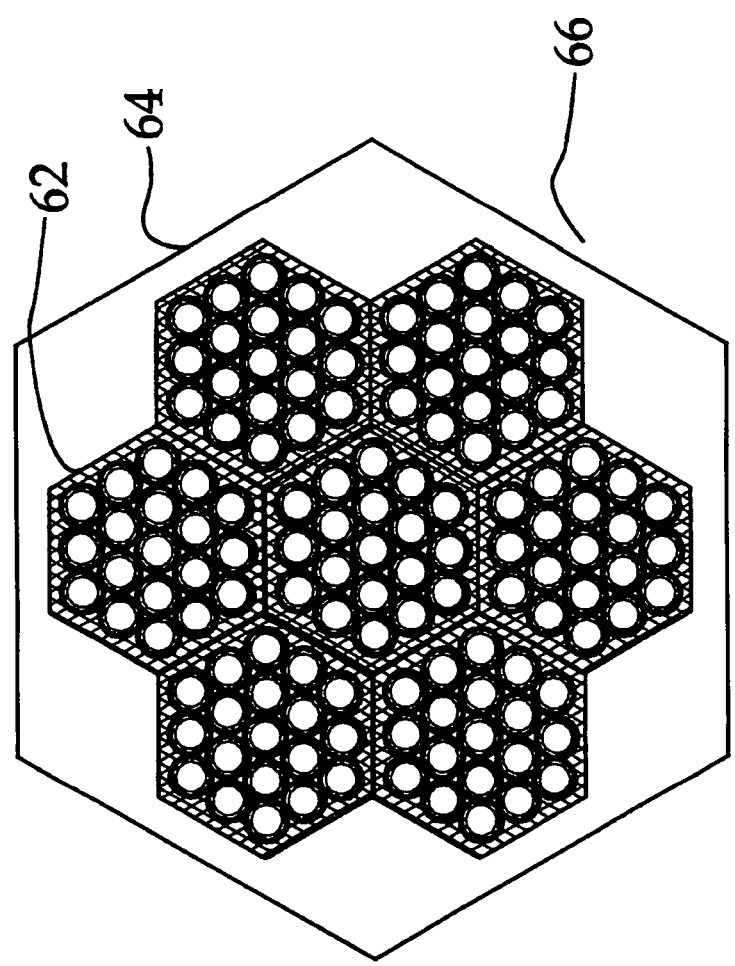
FIGS. 10(*a*) and (*b*) are schematic end views of a plurality of the first sub-stacks shown in FIG. 9 positioned in a side-by-side close-packed arrangement to form a stack.
Figure 10B:
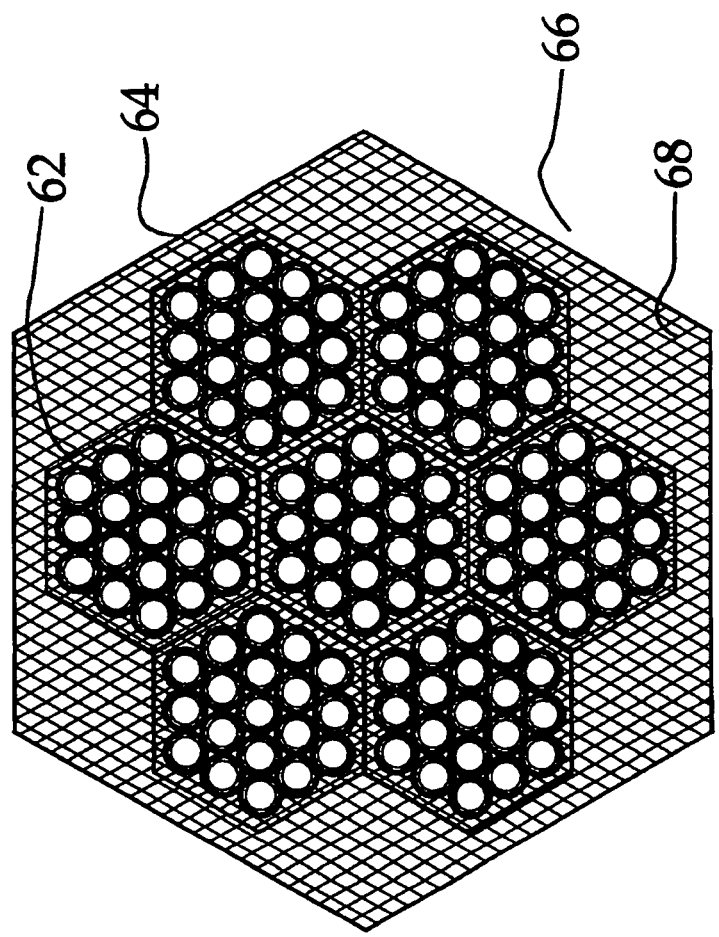

Referring to FIG. 10(a), the sub-stacks 62 can be assembled together to form a fuel cell stack 66. A container 64 houses the sub-stacks 62. The container wall 60 of each sub-stack 62 can be non-porous or have a low-porosity, so that reactant flow to each fuel cell 12 in each sub-stack 62 can be controlled. Referring to FIG. 10(b), the sub-stacks 62 can be embedded in another solid phase porous foam support structure 68 within the container 64 which can be either electrically insulating or conductive.

Figure 11:
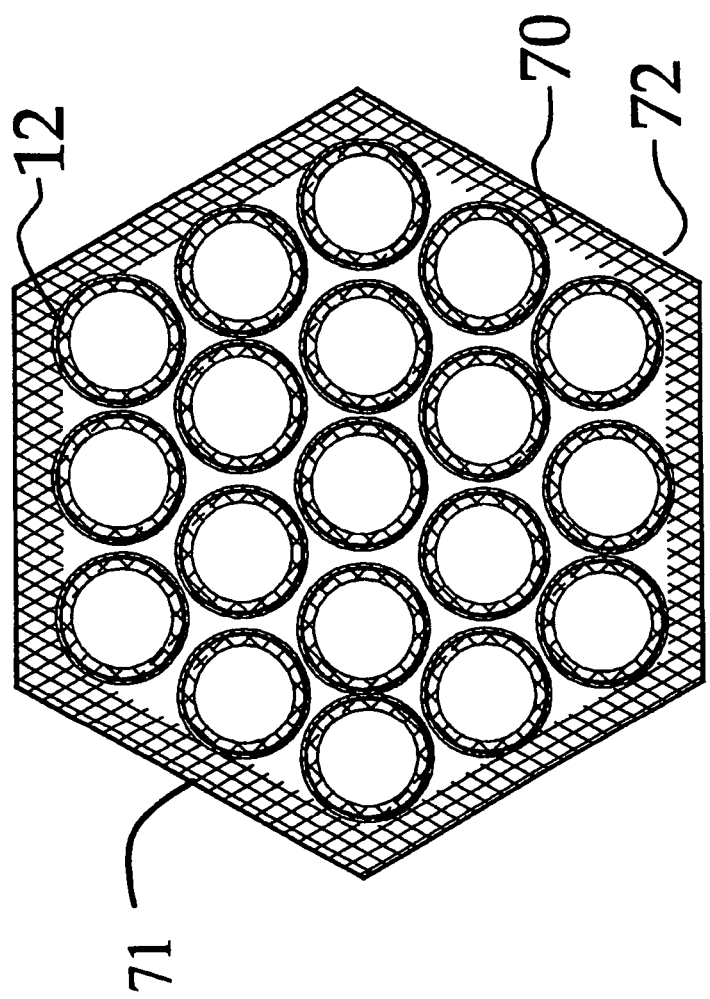
FIG. 11 is a schematic end view of a second fuel cell sub-stack wherein a plurality of the fuel cell subassemblies are positioned side-by-side in a spaced arrangement, and partially embedded in the support matrix.
Figure 12B:
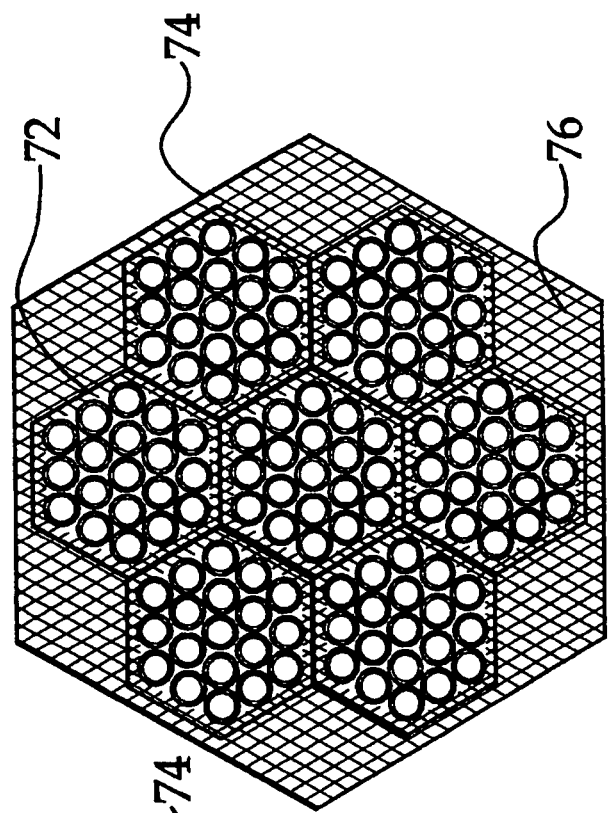
FIGS. 12(*a*) and (*b*) are schematic end views of a plurality of the second sub-stacks shown in FIG. 11 positioned in a side-by-side close-packed arrangement to form a stack, wherein the stack shown in FIG. 12(*a*) is not embedded in the support matrix, and the stack shown in FIG. 12(*b*) is embedded in the support matrix.
Figure 12A:
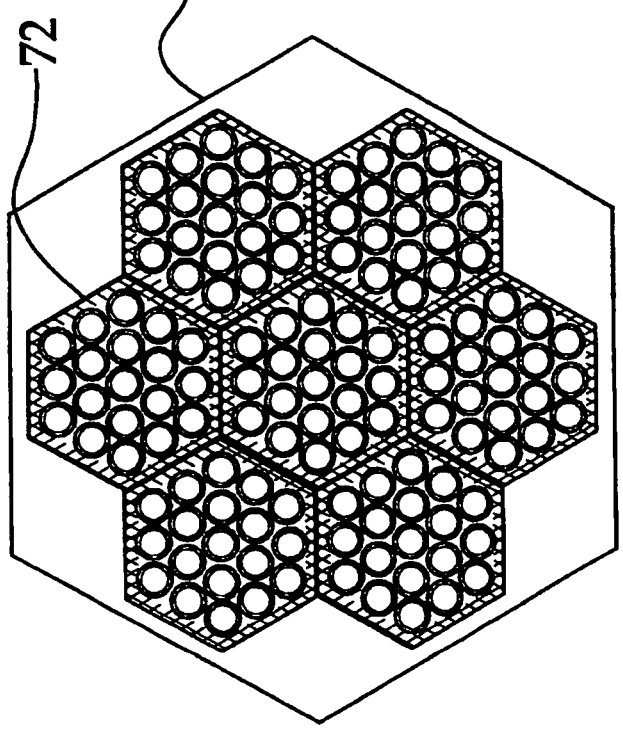

Referring to FIG. 11 and according to another embodiment of the invention, multiple fuel cells 12 are arranged side-by-side in a closely-spaced, non-contacting cluster. The fuel cells 12 are held in place by end caps or manifold (not shown) fastened to one or both ends of the fuel cells 12. The fuel cells 12 at the outside periphery ("outer fuel cells 12") of the cluster are partially embedded in a matrix support structure 70 and a container wall 71 to form a sub-stack 72. The matrix support structure 70 can be electrically conductive or insulating. When conductive, then the outer fuel cells 12 can be electrically coupled to the foam support structure 70 in parallel, or, one or more of the outer fuel cells 12 can be surrounded by a layer of matrix material (not shown) to electrically isolate those fuel cells 12 from the matrix support structure 70. FIGS. 12(a) and 12(b) show multiple sub-stacks 72 assembled together to form a stack 74 with or without being embedded in a solid phase porous foam matrix 76 (shown in FIGS. 12(a) and (b) respectively).

While the preferred embodiment of the invention has been illustrated and described, it will be appreciated that various changes can be made therein without departing from the scope and spirit of the invention. For example, the multiple region matrix 20 can be used in membrane reactor and other non-fuel cell electrochemical device applications.

The invention claimed is:
1. A solid oxide fuel cell stack comprising
 (a) at least one tubular solid oxide fuel cell comprising a tubular inner electrode layer, a tubular outer electrode layer, and a tubular electrolyte layer sandwiched between the inner and other electrode layers, and
 (b) a matrix in which the at least one fuel cell is embedded, the matrix having multiple solid phase porous regions comprising first and second solid phase porous foam matrix regions, wherein the first matrix region is electrically conductive and the second matrix region is electrically insulating; and
 wherein the solid oxide fuel cell stack comprises multiple fuel cells and some of the fuel cells are embedded in the first matrix region and the remaining fuel cells are embedded in the second matrix region.

2. A fuel cell stack as claimed in claim 1 wherein the second matrix region has a composition including a material selected from the group consisting of oxide ceramics, carbide ceramics, and nitride ceramics.

3. A fuel cell stack as claimed in claim 2 wherein the second matrix region has a composition including a material selected from the group consisting of alumina, mullite, silicon nitride, and aluminum nitride.

4. A fuel cell stack as claimed in claim 1 wherein the first matrix region has a composition including a material selected from the group consisting of electrically conductive materials consisting of: lanthanum strontium manganate (LSM); lanthanum strontium ferrite (LSF); samarium strontium cobaltite (SSC); 316 and 316L stainless steels; oxide and carbide ceramics; austenitic nickel-chromium-based super-alloy; super-alloy; ferritic steel; SiC; $MoSi_2$; silver; silver-copper-palladium alloy; silver-palladium alloy; silver-platinum alloy; silver-palladium-platinum alloy; silver-gold-platinum alloy; silver-gold-palladium alloy; gold and gold alloys; copper and copper alloys; and, cermets of austenitic nickel-chromium-based super-alloy, super-alloy, ferritic steel, SiC, $MoSi_2$, silver, silver-copper-palladium alloy, silver-palladium alloy, silver-platinum alloy, silver-palladium-platinum alloy, silver-gold-platinum alloy, silver-gold-palladium alloy, gold and gold alloys, and copper and copper alloys.

5. A fuel cell stack as claimed in 1 wherein the outer electrode layer is an anode and the first matrix region has a composition selected from the group of electrically conductive materials consisting of: Ni-Yttria stabilized zirconia cermet; Ni and doped zirconia cermet; Ni and doped —$CeO_2$ cermet; and Cu and doped-ceria cermet.

6. A fuel cell stack as claimed in claim 1 wherein the matrix comprises an electrically insulating solid phase porous foam base structure partially coated with an electrically conductive material, such that uncoated portions of the base structure form an electrically insulating first matrix region, and the coated portions of the base structure form an electrically conductive second matrix region.

7. A fuel cell stack as claimed in claim 1 wherein the first or second matrix region has a composition including a material selected from the group of high emissitivity materials consisting of surface oxidized steel, super alloys and bulk SiC, and LSM.

8. A fuel cell stack as claimed in claim 7 wherein the first or second matrix region comprises a low emissivity base structure coated with a material selected from the group of high emissitivity materials consisting of surface oxidized steel, super alloys and bulk SiC, and LSM.

9. A fuel cell stack as claimed in claim 1 wherein the outer electrode is a cathode, and the first matrix region is a) electrically conductive, b) contacts the cathode, and c) comprises a catalytic material that promotes oxygen ionization electrochemical reaction or catalytically burns a fuel-oxidant mixture.

10. A fuel cell stack as claimed in claim 9 wherein the catalytic material is selected from the group consisting of: LSM, LSF, Pt, Pd, Pt—Pd, Pt-alloys, and Pd-alloys.

11. A fuel cell stack a claimed in claim 1 wherein the outer electrode layer is an anode, and the first matrix region is electrically conductive, contacts the anode, and is coated with a catalyst material that promotes a fuel reforming reaction.

12. A fuel cell stack as claimed in claim 11 wherein the catalytic material is selected from the group consisting of: Cu/ZnO alloys, Ni and its alloys, Pt and its alloys, and Pd and its alloys.

13. A fuel cell stack as claimed in claim 12 wherein the first matrix region is further coated with a catalyst material that promotes an electrochemical reaction.

14. A fuel cell stack as claimed in claim 9 wherein the second matrix region comprises a lower loading of catalyst material than the first matrix region.

15. A fuel cell stack as claimed in claim 1 wherein the first matrix region is a tubular solid state porous foam layer surrounding at least one fuel cell, and the second matrix region is a solid state porous foam support structure in which the first matrix region is embedded.

16. A solid oxide fuel cell stack comprising:
(a) at least one tubular solid oxide fuel cell comprising a tubular inner electrode layer, a tubular outer electrode layer, and a tubular electrolyte layer sandwiched between the inner and outer electrode layers; and
(b) a matrix in which the at least one fuel cell is embedded, the matrix having multiple solid phase porous regions comprising first and second matrix regions, wherein the first matrix region is a tubular solid state porous foam layer surrounding at least one fuel cell, and the second matrix region is a solid state porous foam support structure in which the first matrix region is embedded, wherein electrical conductivity is different between the first and second matrix regions, and wherein the porosity of the second matrix region is greater than the porosity of the first matrix region.

17. A furl cell stack as claimed in claim 16 wherein the first and second matrix regions are bonded at their interface by a bonding phase.

18. A fuel cell stack as claimed in claim 17 wherein the first matrix region is electrically conductive and the second matrix region is electrically insulating.

19. A solid oxide fuel cell comprising:
(a) at least one tubular solid oxide fuel cell comprising a tubular inner electrode layer, a tubular outer electrode layer, and a tubular electrolyte layer sandwiched between the inner and outer electrode layers; and
(b) a matrix in which the at least one fuel cell is embedded the matrix having multiple solid phase porous regions comprising first and second matrix regions, wherein the first matrix region is a tubular solid state porous foam layer surrounding at least one fuel cell, and the second matrix region is a solid state porous foam support structure in which the first matrix region is embedded, and wherein electrical conductivity is different between the first and second matrix regions;
wherein the stack comprises multiple fuel cells of which some fuel cells are surrounded by the first matrix region, and at least some of the remaining fuel cells are surrounded by the second matrix region.

20. A fuel cell stack as claimed in claim 19 wherein the first matrix region is electrically insulating and the second matrix region is electrically conductive.

21. A solid oxide fuel cell stack comprising:
(a) at least one tubular solid oxide fuel cell comprising a tubular inner electrode layer, a tubular outer electrode layer, and a tubular electrolyte layer sandwiched between the inner and outer electrode layers;
(b) a matrix in which the at least one fuel cell is embedded, the matrix having multiple solid phase porous regions comprising first and second matrix regions, wherein the first matrix region is a tubular solid state porous foam layer surrounding at least one fuel cell, and the second matrix region is a solid state porous foam support structure in which the first matrix region is embedded, and wherein electrical conductivity is different between the first and second matrix regions; and
(c) a buffering matrix region surrounding the second matrix region and comprising a material selected from the group consisting of a solid state porous foam and a porous metal mesh.

22. A fuel cell stack as claimed in claim 11 wherein the second matrix region is coated with a lower loading of catalyst material than the first matrix region.

23. A solid oxide fuel cell stack comprising:
(a) at least one tubular solid oxide fuel cell comprising a tubular inner electrode layer, a tubular outer electrode layer, and a tubular electrolyte layer sandwiched between the inner and outer electrode layers; and
(b) a matrix in which the at least one fuel cell is embedded, the matrix having multiple solid phase porous regions comprising first and second matrix regions, wherein electrical conductivity is different between the first and second matrix regions and wherein porosity is different between the first and second matrix regions.

24. A fuel cell stack as claimed in claim 1 wherein catalytic loading is different between the first and second matrix regions.

* * * * *

UNITED STATES PATENT AND TRADEMARK OFFICE
CERTIFICATE OF CORRECTION

PATENT NO. : 8,709,674 B2
APPLICATION NO. : 11/303042
DATED : April 29, 2014
INVENTOR(S) : Partho Sarkar, Mark Richardson and Luis Yamarte It is certified that error appears in the above-identified patent and that said Letters Patent is hereby corrected as shown below:

In the Specification

In column 2 at line 32, change "of" to --of:--.

In column 2 at line 35, change "LaCr(Mg)$O_3$,doped" to --LaCr(Mg)$O_3$, doped--.

In column 2 at line 56, change "emissitivity" to --emissivity--.

In column 4 at line 36, change "sulicides" to --silicides--.

In column 5 at line 21, change "alla," to --alia,--.

In column 5 at line 64, change "LaCr(Mg)$O_3$,doped" to --LaCr(Mg)$O_3$, doped--.

In column 5 at line 65, after "$La_{1-x}Ca_xCrO_3$," insert --$La_{1-x}Mg_xCrO_3$,--.

In column 6 at line 14, change "material::" to --materials--.

In the Claims

In column 12 at line 34, in Claim 1, change "other" to --outer--.

In column 12 at line 39, in Claim 1, change "conductive" to --conductive,--.

In column 12 at line 64, in Claim 4, change "of" to --of:--.

In column 13 at line 3, in Claim 5, change "in 1" to --in claim 1--.

In column 13 at line 18, in Claim 7, change "emissitivity" to --emissivity--.

In column 13 at line 22, in Claim 8, change "emissitivity" to --emissivity--.

In column 13 at line 24, in Claim 8, change "emissitivity" to --emissivity--.

In column 13 at line 35, in Claim 11, change "a" to --as--.

In column 14 at line 4, in Claim 17, change "furl" to --fuel--.

In column 14 at line 10, in Claim 19, after "cell" insert --stack--.

In column 14 at line 15, in Claim 19, change "embedded" to --embedded,--.

Signed and Sealed this
Twentieth Day of January, 2015

Michelle K. Lee
*Deputy Director of the United States Patent and Trademark Office*